(12) United States Patent
     Buck

(10) Patent No.: US 8,560,429 B2
(45) Date of Patent: Oct. 15, 2013

(54) SYSTEM AND METHOD FOR ASSISTED AWARENESS

(75) Inventor: Brian J. Buck, Lisle, IL (US)

(73) Assignee: Trading Technologies International, Inc., Chicago, IL (US)

(*) Notice: Subject to any disclaimer, the term of this patent is extended or adjusted under 35 U.S.C. 154(b) by 58 days.

(21) Appl. No.: 13/347,300

(22) Filed: Jan. 10, 2012

(65) Prior Publication Data

US 2012/0109813 A1    May 3, 2012

Related U.S. Application Data

(63) Continuation of application No. 10/950,904, filed on Sep. 27, 2004, now Pat. No. 8,117,102.

(51) Int. Cl.
    *G06Q 40/00* (2012.01)
    *G06Q 40/04* (2012.01)
    *G06Q 40/06* (2012.01)
    *G06Q 40/02* (2012.01)
    *G06Q 20/10* (2012.01)
    *G06Q 30/08* (2012.01)

(52) U.S. Cl.
    CPC .......... *G06Q 40/00* (2013.01); *G06Q 40/04* (2013.01); *G06Q 40/06* (2013.01); *G06Q 40/025* (2013.01); *G06Q 20/10* (2013.01); *G06Q 30/08* (2013.01)
    USPC .............................................. 705/37; 705/35

(58) Field of Classification Search
    CPC .................................................. G06Q 40/00
    USPC ........... 705/35, 36, 36 R, 37; 345/440, 440.1, 345/440.2
    See application file for complete search history.

(56) References Cited

U.S. PATENT DOCUMENTS

| | | | |
|---|---|---|---|
| 5,220,361 | A | 6/1993 | Lehmer et al. |
| 5,339,392 | A | 8/1994 | Risberg et al. |
| 5,347,452 | A | 9/1994 | Bay, Jr. |
| 5,471,542 | A | 11/1995 | Ragland |
| 5,689,651 | A | 11/1997 | Lozman |
| 5,797,002 | A | 8/1998 | Patterson, Jr. et al. |
| 5,831,954 | A | 11/1998 | Tagnazzini et al. |
| 6,106,119 | A | 8/2000 | Edwards |
| 6,134,535 | A | 10/2000 | Belzberg |
| 6,272,474 | B1 | 8/2001 | Garcia |
| 6,577,329 | B1 | 6/2003 | Flickner et al. |
| 6,608,615 | B1 | 8/2003 | Martins |
| 6,766,304 | B2 | 7/2004 | Kemp, II et al. |

(Continued)

OTHER PUBLICATIONS

The Free Online Dictionary, Thesaurus; Definition of "period of time"; Date Unknown; pp. 1 and 2.*

(Continued)

*Primary Examiner* — Ella Colbert
(74) *Attorney, Agent, or Firm* — McDonnell Boehnen Hulbert & Berghoff LLP

(57) ABSTRACT

A data feed is monitored to determine whether a condition is satisfied. If the condition is satisfied, an alert is initiated to attract a user's attention. Thereafter, playback mode is entered causing the example system to playback a short period of time-compressed data that occurred just prior to the event occurring to set context for the user. Once the playback signal has caught up with the real-time data feed, the data is output at normal levels. Other configurations, which are described herein, are also possible.

24 Claims, 5 Drawing Sheets

(56) References Cited

U.S. PATENT DOCUMENTS

| | | | |
|---|---|---|---|
| 6,772,132 B1 | 8/2004 | Kemp, II et al. | |
| 6,792,617 B2 | 9/2004 | Gorbatov et al. | |
| 6,801,201 B2 * | 10/2004 | Escher | 705/36 R |
| 6,988,132 B2 | 1/2006 | Horvitz | |
| 7,002,570 B2 | 2/2006 | Perry et al. | |
| 7,110,974 B1 * | 9/2006 | Rust | 705/37 |
| 7,113,190 B2 | 9/2006 | Heaton | |
| 7,127,424 B2 | 10/2006 | Kemp, II et al. | |
| 7,138,575 B2 | 11/2006 | Childs, Jr. et al. | |
| 7,202,793 B2 | 4/2007 | Grace et al. | |
| 7,356,501 B2 * | 4/2008 | Churquina | 705/37 |
| 7,389,268 B1 | 6/2008 | Kemp, II et al. | |
| 7,391,887 B2 | 6/2008 | Durnell | |
| 7,590,587 B2 | 9/2009 | Duquette | |
| 7,680,721 B2 * | 3/2010 | Cutler | 705/37 |
| 7,701,456 B1 | 4/2010 | Buck | |
| 7,739,182 B2 * | 6/2010 | Myr | 705/37 |
| 7,743,340 B2 | 6/2010 | Horvitz et al. | |
| 7,747,486 B1 * | 6/2010 | Smith | 705/35 |
| 7,818,232 B1 * | 10/2010 | Mead et al. | 705/36 R |
| 7,877,312 B2 * | 1/2011 | Thompson et al. | 705/37 |
| 7,913,183 B2 | 3/2011 | Czerwinski et al. | |
| 7,941,357 B2 * | 5/2011 | McGeorge | 705/36 R |
| 7,962,398 B1 * | 6/2011 | Swearingen et al. | 705/37 |
| 8,117,102 B1 | 2/2012 | Buck | |
| 8,232,962 B2 | 7/2012 | Buck | |
| 2001/0056391 A1 | 12/2001 | Schultz | |
| 2002/0023038 A1 | 2/2002 | Fritsch et al. | |
| 2002/0039111 A1 | 4/2002 | Gips et al. | |
| 2002/0055899 A1 | 5/2002 | Williams | |
| 2002/0069079 A1 | 6/2002 | Vega | |
| 2002/0130858 A1 | 9/2002 | Perry et al. | |
| 2002/0130868 A1 | 9/2002 | Smith | |
| 2002/0161685 A1 | 10/2002 | Dwinnell | |
| 2002/0174199 A1 | 11/2002 | Horvitz | |
| 2003/0009411 A1 | 1/2003 | Ram et al. | |
| 2003/0038754 A1 | 2/2003 | Goldstein et al. | |
| 2003/0177085 A1 | 9/2003 | Buckwalter et al. | |
| 2004/0055447 A1 | 3/2004 | Childs, Jr. et al. | |
| 2004/0066414 A1 | 4/2004 | Czerwinski et al. | |
| 2004/0070509 A1 | 4/2004 | Grace et al. | |
| 2004/0098462 A1 | 5/2004 | Horvitz et al. | |
| 2004/0100467 A1 | 5/2004 | Heaton | |
| 2004/0210504 A1 | 10/2004 | Rutman | |
| 2005/0192887 A1 * | 9/2005 | Triplett | 705/37 |
| 2006/0037038 A1 | 2/2006 | Buck | |
| 2012/0233059 A1 | 9/2012 | Buck | |

OTHER PUBLICATIONS

Free Merriam-Webster Dictionary; Definition of "substantial" and "substantially"; Date Unknown; pp. 1 and 2.*

UK-Cautious Investment in Digital Investment in the City; "Cautious Investment in Digital Investment in the City"; Jan. 1991; p. 1.*

Katherine Macklem; "Only for the stout of heart: In the heat of a day-trading room, a mere touch on a computer keyboard as you watch intraday gyrations of stock markets can earn or cost thousands of dollars"; Feb. 13, 1999; pp. 1-2.*

Yamazaki Takaakl; "Stock Violation Index Calculation Processing Program"; Feb. 21, 2003; p. 1.*

U.S. Appl. No. 10/950,904, filed Sep. 27, 2004, Buck.

Gresh, D.L, et al., "An Interactive Framework for Visualizing Foreign Currency Exchange Options " *Proceeding Visualization 1999*, San Francisco, CA, Oct. 24, 29, 1999, Piscataway, NY: IEEE, 1999, Abstract, p. 1.

Jereski, L. and Zweig, C., "The Mouse that Trades," *Forbes*, Oct. 28, 1991, p. 186 [Retrieved on Nov. 2, 2009] from Dialog at https://www.dialogclassic.com/mainframe/html (3 pages).

U.S. Appl. No. 11/415,861, filed May 2, 2006, Buck.

International Search Report of International Application No. PCT/US2005/021700, dated Oct. 25, 2005 (mailed Dec. 29, 2005).

* cited by examiner

SYSTEM AND METHOD FOR ASSISTED AWARENESS

CROSS REFERENCE TO RELATED APPLICATIONS

This application is a continuation of U.S. patent application Ser. No. 10/950,904, filed Sep. 27, 2004, now U.S. Pat. No. 8,117,102, entitled "System and Method for Assisted Awareness," the contents of which are fully incorporated by reference herein.

TECHNICAL FIELD

The present invention relates to the field of human-computer interface technology, and more particularly to a system and method for alerting a user when a particular event occurs and providing contextual feedback to the user regarding the same.

BACKGROUND

Many computer-based innovations rely upon a human-computer interface to effectively convey information to the user. Graphics programs on a personal computer, a spacecraft cockpit, dash instrumentation in a vehicle, a personal digital assistant, or any other computer and/or embedded computation machine typically employs the use of an interface. Because of the importance of having an effective human-computer interface, much focus has been centered around the design and implementation of them, especially to reduce the cognitive and memory load on the user.

As such, much effort has gone into ways to filter or reduce the amount of "information overload" on the user. Yet, there is another problem, generally referred to as "attention deficit," that is not often solved by using the same tools that reduce information overload. Attention deficit refers to the idea that the human user does not have nearly enough attention to deal with all of the information presented in traditional manners. Therefore, the human-user may experience a reduction in awareness pertaining to significant or interesting events.

One particular industry where information must be rapidly received and assimilated by a user through an interface is electronic trading. In electronic trading, an exchange brings buyers and sellers, also referred to as traders, together for the electronic execution of trades. Traders remotely log onto the exchange through their trading stations to receive market data. The trading stations utilize specialized trading interfaces to display the market data and facilitate order entry. The trading interfaces are generally configured to update quickly to reflect near instant changes in the market.

An example of a trading interface, which provides an especially intuitive view of the market, is described in U.S. Pat. Nos. 6,766,304 and 6,772,132 given both to Kemp et al. The entire content of each of the above-referenced patents is incorporated herein by reference. This particular trading interface displays market data in alignment with an axis of prices in a window on the screen of a trading station. The user can view the market's movement simply by watching the bid and ask indicators ascend or descend the axis.

A typical trading interface might present market information for one tradable object or many tradable objects, depending on the type of interface and its intended purpose. Users might also have more than one trading window on their screen. Some users even go so far as to have two or more computer screens for displaying numerous trading windows. As used herein, the term "tradable object" refers to anything that can be traded with a quantity and/or a price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradable object may be "real," such as products that are listed by an exchange for trading, or "synthetic," such as a combination of real products that is created by the user. A tradable object could actually be a combination of other tradable objects, such as a class of tradable objects.

In addition to viewing market information through a trading interface, a user might set up his trading strategy through on-screen programming to view historical charts which can provide insight into the markets he is trading, to view important news which might be relevant to the markets they are trading, or to perform any other task thereby causing the user to look away from a given item or window on the screen. Additionally, the user might be subject to other distractions and interruptions, such as receiving an email or answering a telephone call.

Besides the distractions and interruptions, the human user can invariably focus on limited portions of a screen at any single time. This limited ability may result in missing important pieces of information that were presented at the same time, or near the same time, the user was focusing on something else. In some instances, where there is a great deal of information being displayed in a single window, the user might even miss something being presented in the same window on which he is currently focusing on.

As computer use becomes more widespread, especially in the area of electronic trading, the ability to assimilate large amounts of data becomes an increasing concern. It may be very difficult, next to impossible, for the user to be aware of everything that is potentially relevant to the user's activity without some assistance. As indicated earlier, much effort has already gone into designing an interface that guides and constrains human interactions to reduce the cognitive and memory load on the individual. While helping the user focus on one particular window of information may be desirable, this effort does not address the sort of problems incurred by users of such computer-based systems, especially in the electronic trading industry.

BRIEF DESCRIPTION OF THE DRAWINGS

Many aspects of the example embodiments may be better understood with reference to the following drawings. The components in the drawings are not necessarily to scale, emphasis instead being placed upon illustrating example embodiments. Also, the same numbers, if any, refer to the same elements throughout.

DETAILED DESCRIPTION

I. Introductory Overview

Figure 1:
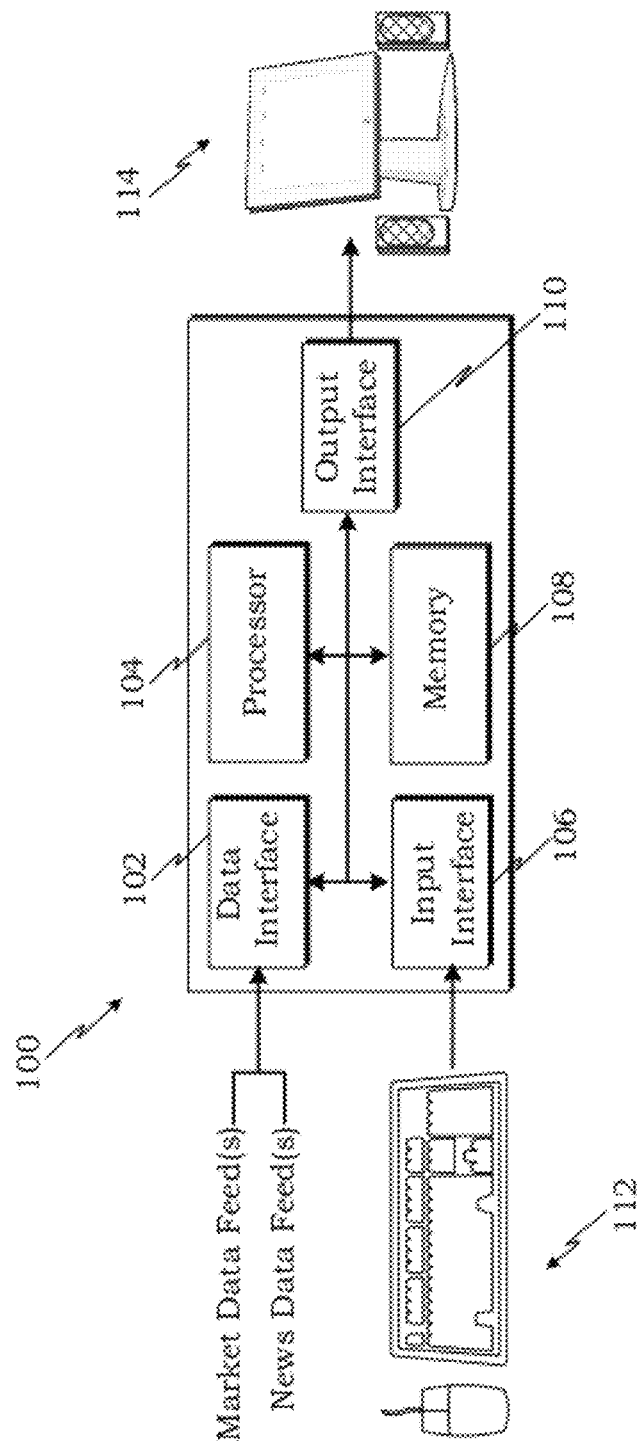
FIG. 1 is a block diagram of an example system, in accordance with a preferred embodiment, that alerts a user when a particular event occurs and provides contextual feedback to the user regarding the same.

The example system and method are appropriate for use in situations where human-computer interfaces are implemented, and particularly in an electronic trading environment. The example system and method assist the user to become aware of and pay attention to significant or interesting events, preferably around the time that the event has just occurred.

According to a preferred embodiment, the example system records some or all of a data feed signal and it provides an alert when a particular event occurs in the signal. Thereafter, the example system switches to fast playback of the recorded portion of the data feed signal, thereby providing context for the actions that occurred just prior to the event. The example system switches back to normal operation when the playback signal and the data feed signal coincide in time. Further, options may be made available to the user to again replay the section identified as being of interest, or even sections of the data further back in time. While many of the example embodiments are described in the area of electronic trading, it will be understood by those of ordinary skill in the art that the example system and method may be embodied in many different forms and should not be construed as limited to electronic trading.

An advantage is that a user of the example system can pay attention to the information content in the data feed signal when it is important, as indicated by the alert and playback system, and not the rest of the time. Therefore, the user can focus on other items of interest or perform other tasks while the example system is monitoring the data feed signal for the event, and then assisting the user to become aware of what is significant and/or interesting about the given event.

Another advantage is that the example system provides an alerting mechanism that alerts the user when a particular event occurs. The alerting mechanism is triggered when an event occurs in an attempt to attract the user's attention to the event. In a preferred embodiment, the event is predefined by the user through the input of one or more conditions. Further, according to another preferred embodiment, the type of alerting mechanism is also configurable by the user. At some point after the alerting mechanism is initiated, the alerting mechanism of the example system can be programmed to gradually subside and have the output signal automatically return to normal operation.

Yet another advantage is that the example system provides a playback feature that provides context for the actions that occurred just prior to the event. The playback feature may be initiated immediately after the event occurs or when the user is actually focused on a specific target area of the computer screen. In a preferred embodiment, the user can program the length and the rate of the playback, such as normal playback or fast playback. According to another preferred embodiment, once the playback signal and the real-time data feed signal coincide in time, the output signal is automatically returned to normal operation.

Another advantage is the data feed signal may comprise data, video, and/or audio signal components. As such, the example system may effectively monitor trading data feeds, news feeds, and/or audio streams (either a standalone audio feed or one associated with a video stream, for instance). In one of these forms, the data feed signal is normally received by a software application designed to receive and output the content of the data feed to the user according to some programmed format. The example system, however, can record the same data feed and when the alerting mechanism is triggered, the system may provide the recorded data feed signal to the appropriate software application so that the recorded portion can be visually and/or audibly played back to the user. Alternative ways of recording and playback of the data feed signal are also described herein.

Other features and advantages will become apparent to one with skill in the art upon examination of the following drawings and examples. It is intended that all such features and advantages be included within the scope of the present invention, and be protected by the accompanying claims. Further, it will be appreciated by those of ordinary skill in the art that the example system may be provided as methods or computer readable program means.

II. An Example System Overview

An example system may be operated in an entirely software embodiment, in an entirely hardware embodiment, or in a combination thereof. In the interest of clarity, the example system is described generally in a software-based embodiment, which is executed on a computer-based device. As such, the example system takes the form of a computer program product that is stored on a computer readable storage medium and is executed by a suitable instruction execution system in the computer-based device. Any suitable computer readable storage medium may be utilized including hard disks, CD-ROMs, optical storage devices, or magnetic storage devices, for example.

FIG. 1 illustrates an example computer system, referenced to by general reference numeral 100, used to carry out an example embodiment. The computer system 100 might represent a trading station for receiving and displaying market information or other trading related data, and it might also be configured for order entry. As such, the computer system 100 might utilize software directed towards the operation of electronic trading, such as having a specialized trading screen that can display data and receive commands from the user to send orders to an exchange, for instance. Actual examples of the computer system 100 include a personal computer, laptop computer, workstation, handheld device, or some other computer-based device. While most of the functionality is implemented at the computer system 100, such as shown in FIG. 1, it is understood that the functionality may be distributed over multiple computer-based devices—for instance, a personal computer and one or more servers.

As shown in the example embodiment of FIG. 1, the computer system 100 includes a data interface 102 for receiving one or more various data feeds, a processor 104 for executing the software, an input interface 106 for communicating with input device(s) 112, a memory section 108 for representing temporary and/or permanent storage used by the system 100, an output interface 110 for controlling display unit and/or speakers 114. While only one display unit is shown in the figure (e.g., display unit and/or speakers 114), additional display units may also be used. Further, each of these internal components, including the data interface 102, the processor 104, the input interface 106, the memory 108 and the output interface 110, may be interconnected by a bus or some other data transfer mechanism. If the computer system 100 is operated in a distributed environment (which is not the environment shown in FIG. 1), then such components, like the memory 108, might communicate with other components over a computer network.

As indicated earlier, the functionality may be distributed over various devices. As an example, the actual data storage (shown as the memory 108 in FIG. 1) may reside on a different physical device from the computer system 100 used to display alerts. To illustrate this example, the computer system might monitor a video stream by using a personal video recorder (PVR) operating under programmatic control of the computer system 100.

Figure 2:
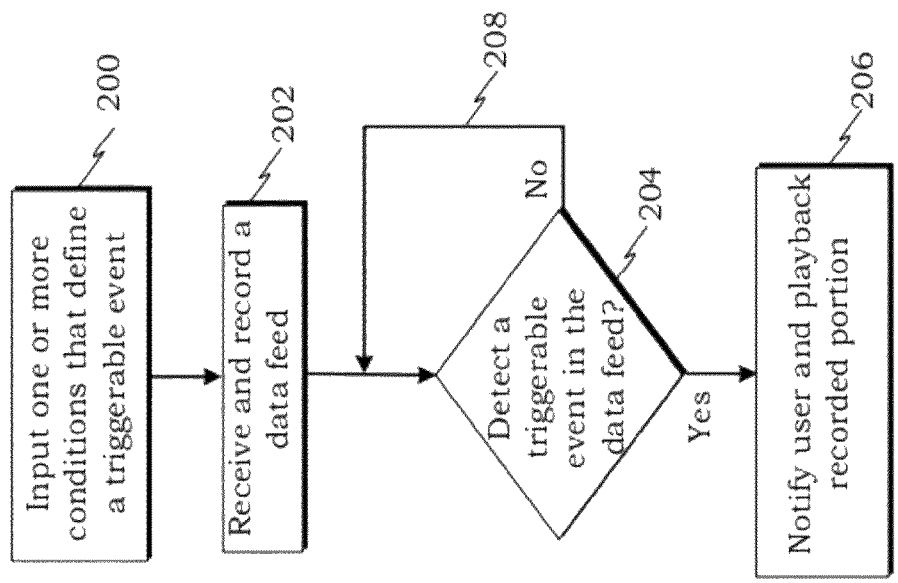
FIG. 2 is a flowchart illustrating an example process, in accordance with a preferred embodiment, for alerting a user when a particular event occurs and providing contextual feedback to the user regarding the same.

FIG. 2 illustrates an example process taken by the example system 100 of FIG. 1 for alerting a user when a particular event occurs and providing contextual feedback to the user regarding the same. It is understood that each block in the figure may represent a module, segment, or portion of code, which includes one or more executable instructions for implementing specific logical functions or steps in the process. Alternate implementations are included within the scope of the preferred embodiments in which functions may be executed out of order from that shown or discussed, including substantially concurrently or in reverse order, depending on the functionality involved, as would be understood by those reasonable skilled in the art. Further, some steps may not need to be implemented to achieve the desired result.

At block 200, one or more conditions are received by the computer system 100 and are used to define a triggerable event. As an example, a triggerable event might include an economic or monetary indicator, such as inflation, interest rates, employment, volume, prices, credit market conditions, changes in the market conditions, or any other particular item of interest to the user. A condition refers generally to an expression or a variable that can be used to define an event. As an example, a condition might include a Boolean expression that yields a Boolean value, like true or false (e.g., if the employment number is announced, then alert and playback). Such expressions can involve comparisons and logical combinations of Boolean expressions. In the interest of clarity, a single condition will be used in the following examples with the understanding that a plurality of conditions may be used (e.g., multiple "if" statements) to define an event. A variety of other basic-to-complex matching/filtering mechanisms could be employed, which could yield a numerical measure of the degree of interest the user would have in this particular piece of content; the user would be able to configure a threshold value for the numerical measure of interest that if met or exceeded would trigger the alerting process. The condition(s) are preferably stored in memory 108.

In a preferred embodiment, the computer system 100 receives the condition through the input interface 106, which may include special programs or drivers to communicate with input devices generally shown as 112. Some example input devices include a mouse and keyboard (shown in the figure), game pad, virtual glove, joystick, or trackball, touch-screen, just to name a few. The user can input the condition through a graphical user interface ("GUI"), which may represent a visual environment with graphical images, such as icons, menus, and dialog boxes on a screen. The user may select and activate these options by pointing and clicking with a mouse, selecting them with a keyboard, or by setting them with some other input device. It is also possible to set such parameters through something other than a graphical user interface, such as through command-line entry.

In an alternative embodiment, the condition may be loaded onto the computer system 100 through a disk drive, CD ("compact disc") drive, DVD ("digital versatile disc", which was previously referred to as "digital video disc"), over a network, or through some other alternative loading mechanism. For instance, assuming that the computer system 100 had a CD drive, then the user could simply insert a CD with the conditions into the drive and load them into memory 108. In a similar manner, a user might receive conditions over a network through email or some other network protocol, and simply load the conditions into memory 108. None of these alternative loading mechanisms are shown in the figure.

At block 202, a data feed signal is received by the computer system 100 through the data interface 102. The data interface 102 may include special programs or drivers to receive (and transmit, if programmed to do so) information pertaining to a particular data feed. The data interface 102 may be the same data interface used by a particular software application that will ordinarily display the original data feed signal to the user. A particular data feed might include data, audio, and/or video components which represent price updates and market depth data from an electronic exchange, product tables, responses and outcomes from an electronic exchange pertaining to order requests, fill information, news and commentary, information concerning charts and analysis, or any other data feed. While the example computer system 100 shown in FIG. 1 is configured to receive data feeds from two information sources (e.g., market data and news data), the data interface 102 may be configured to receive only one data feed (e.g., just market data or news) or multiple data feeds (e.g., market data, news, historical data, audio feed, etc.).

Also at block 202, at least a portion of the data feed signal is recorded into memory 108. The example system can preferably detect which data feed signal to record based on the condition, manual configuration, or any other mechanism. For instance, if a condition refers to monitoring a change in the inside market price for a particular tradable object, then the computer system 100 preferably has the ability to recognize that the data feed signal received for that particular tradable object should be recorded. Alternatively, the user could manually configure the computer system 100 to record the data feed signal for the particular tradable object. This manual configuration may occur through the GUI described earlier or through some other known input mechanism.

In an alternative embodiment, only the viewable and/or audible portion of the data feed signal which is ordinarily output of a particular software application is recorded (instead of the raw data actually found in the data feed signal)—e.g., through the use of screen-capture software or something similar. Then, the recorded screen and/or audio activity can be played back to the user. As an example, if a video was recorded, according to this alternative embodiment, then a series of snapshots may be recorded (rather than recording the actual raw data). Though the use of screen-capture software provides an alternative solution, it might also consume large amounts of memory. Nonetheless, while the examples described herein relate to recording the actual data feed, it is understood that the same process of recording and playback may be similarly applied regardless of how or in what form the data feed signal is recorded (e.g., the actual raw data or by screen-capture).

Figure 3:
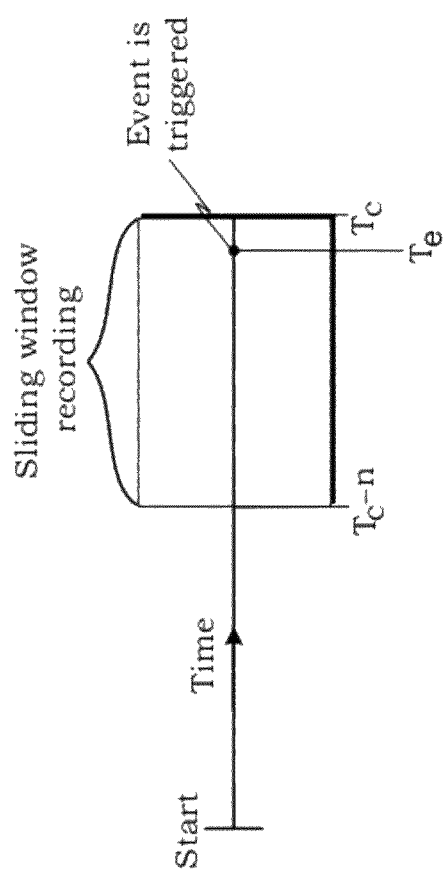
FIG. 3 is a graph for further illustrating various aspects of the example system and process shown in FIGS. 1 and 2.

FIG. 3 illustrates an example operation of how a data feed signal, or portions thereof, may be recorded in accordance with a preferred embodiment. At "Start," the data feed signal is received and the recording preferably has started. The sliding window, which illustratively represents the time recorded, then moves incrementally forward in time, adding new recorded material, and dropping the oldest recorded material (if programmed to do so). The parameter utilized in this process is the size of the sliding window, referred to as "n." In most situations, the parameter "n" might be measured in seconds, although any measurement of time may be selected. It is understood that the size of the window, "n" might be defined by another unit of measurement instead of time, such as the size of memory, the number of conditions that must occur before an alert is initiated, or by any other system of measurement. The parameter "Tc" refers to the current time and the parameter "Te" refers to the time of the event. Preferably, the sliding window is dynamic and spans from the current time minus the window size (e.g., Tc−n) to the current time (e.g., Tc). In some instances, the sliding window may span the entire length of the data feed signal (e.g., from "Start" until the current time, "Tc"), more of which is described below.

It is useful to note that the amount of historical data feed that has been recorded may be different from the amount of data (according to user configuration/preference) that will be replayed to provide context when alerting. For instance, it might be desirable to record the data feed signal over extended periods of time thereby allowing the user to go further back in time to view a larger segment of historical context in the data, or for other reasons. As an example, the user might be recording the previous hour of the data stream even though the "window" used for playback may be only a matter of seconds. Therefore, it should be understood that the length of recording may be equal to or greater than the actual playback length. Using the sliding window concept, there could be a "recording window" and a "playback window."

If at block 204 in FIG. 2, the condition is not satisfied according to the expression(s), then the monitoring of the data feed preferably continues as shown by arrow 208. The information continues to be recorded according to the preferred sliding window method illustrated with respect to FIG. 3. If the condition is satisfied according to the expression(s), then, at 206, the user is preferably alerted along with a playback of a time-compressed (or a non time-compressed signal, if so programmed) recording to provide context for the actions that occurred just prior to the condition being satisfied. Such as indicated earlier, the user, or someone else for that matter, can input the condition(s) and/or preferences at any time prior to the condition being satisfied.

As indicated earlier, the example system may provide the recorded data feed signal to the appropriate software application so that the recorded portion can be played back to the user through output interface 110. The output interface 110 may include special programs or drivers to interface certain audio and/or video devices generally indicated as 114. Some example video output devices include a cathode ray tube (CRT), a liquid crystal display (LCD), plasma monitor, or any other display device and/or audio speakers, headphones, or any other audio reproduction mechanism.

To determine whether a condition is satisfied, the example computer system 100 preferably implements a keyword or key-phrase spotting algorithm, such as known in the art. Keyword spotting is generally the process of detecting a pre-fixed set of words or characters in the data feed, which might include text or an audio signal. Filtering may be implemented to reduce false triggers. Then, when the indicator is received, the keyword spotting application can spot certain words signifying a condition is satisfied or detected. Preferably, the keyword or key-phrase spotting algorithm can detect words of phrases in data, audio, and/or video feeds.

In yet another example embodiment, to make it easier to detect certain conditions, special tags may be strategically placed in the data feed (preferably at the source or at an intermediary device such as a gateway) so that when an indicator is published in a data feed, the example system can first detect the tag and then alert the user. In a general sense, a tag represents one or more characters that identifies what is to come, however, more complex tags could be used (e.g., identifying what is to come, when it is coming, etc.). As an example, a tag could be included, ahead of time, in a news data feed signal so that when an employment number is streaming to the client device, the computer system 100 could first detect the employment-number tag and then successfully alert the user that the employment number is about to be announced. Similar mechanisms to tags may be used, such as black frames sometimes used in video processing, and/or embedding data into the VBI (Vertical Blanking Interval), etc.

In one example embodiment, when an event is detected at time "Te", the recording is instantly (or near instantly) played back to the user starting from time "Tc−n." In doing so, the computer system 100 retrieves the recorded information from memory 108 to provide the playback signal, which preferably represents a time-compressed version of the recording, through output interface 110 (via the software application that normally outputs the data feed signal). The compression may have occurred at the time of recording, or may consist of a variety data-based or perceptual-based compression algorithms applied during playback to support the user's review of the data feed signal at a rate the same as or faster than the original data feed. When viewed on the screen (and/or heard through the speakers), the time-compressed output signal provides the recording in a fraction of the original time duration. Preferably, the playback rate is faster than the rate at which recording was stored and, as a result, there is a point in time at which playback signal and the real-time data feed signal coincides in time, shown at time "Tc." To do this, the data feed signal may still be recorded, even during playback, as indicated between the time "Te" and "Tc," as shown in FIG. 3. At this point (at time "Tc"), the output signal is automatically switched back to the real-time data feed signal. The playback rate can be set by the user or hard-coded into the system 100.

In another example embodiment, when an event is detected at time "Te", the recording is played back when the user's attention focuses on a certain target area (however, it is still preferred that the alerting mechanism has been initiated at time "Te"). In an example, a gaze-tracking device may be utilized to determine the user's gaze position on the computer screen. When the user's gaze enters the target area, which is detected by the gaze-tracking device, it may start playback of the recording. By not starting the playback immediately, this embodiment takes into account the time from when the alert is given to the time the user is actually viewing the item of interest.

It is generally understood that the example system may handle multiple alerts that trigger at the same time or near the same time. Sometimes, these alerts may not interfere with one another (e.g., they might use different alerting mechanisms). However, there may be instances when certain alerting mechanisms do interfere with one another—in those situations, to prevent a priority battle, the example system may apply priority rules (preferably set by the user in advance) to determine which alerting and reporting mechanism "wins," or alternatively, the example system offers options to the user on how the alerting mechanisms may operate together. While, the example system may handle multiple alerts at the same time, this particular embodiment allows for those alerting mechanisms that perhaps would interfere with one another.

It is also understood that the audio aspect of the recorded material may often be related to the video aspect of the recorded material and the two may be used together to generate a type of audiovisual display. When the apparent display rate of the video display is varied, the audio display and video display should be synchronized to maintain temporal correspondence between the content of the audio and video displays. Alternatively, the audio portion may be eliminated altogether, thus eliminating the need to maintain synchronization—however, the content of the audio would be lost.

The display rate of the video may be increased by deleting video data in a uniform manner, as appropriate, and deleting audio data in a uniform manner that corresponds to the deletion of the video data. While this approach may be effective in maintaining synchronization, it might cause distortion in the audio and video displays under certain circumstances. In another embodiment, the video and audio data are deleted in an intelligent and non-uniform manner, especially during times when the audio signal is silent or no changes in the video are apparent, thereby eliminating or reducing distortion. Those of ordinary skill in the art will recognize other ways of varying the playback rate while reducing the distortion, especially the types of distortion to which the human perceptual system is sensitive.

To catch the user's attention at the time of the event, the example computer system 100 may utilize an attention garnering mechanism. In an example embodiment, an alert is utilized causing an audible and/or visual indication which signals to the user that a condition has been satisfied. Some examples are given directly below with the understanding that any mechanism used to alert the user can be used. In each instance, the alert mechanism is preferably reduced (gradually) to normal levels or to levels equal to the levels prior to the event occurring. The time at which the alert is reduced is preferably configurable, such as after a certain time period or after a certain number of events have occurred, etc.

According to one example embodiment, if a windowing environment is utilized, the window (or a border of the window) that displays the information might be highlighted or caused to flash, or some combination thereof. Further, the window may be placed on top of any other windows on the computer screen or moved to a different computer screen—if another screen is connected. Regardless of the environment, however, the keyword or the area associated with the keyword or event may be highlighted or caused to flash or brought to the user's attention in some other fashion.

According to another example embodiment, it was indicated earlier that an audio signal may sometimes accompany a video signal. If so, then the speakers 214 may be turned "ON," if not already and the volume turned up to a predefined level in an effort to gain the user's attention.

According to another example embodiment, if the data feed did not contain an audio signal, a TTS (text to speech) algorithm can be employed to generate an audio stream for playback from the text in the original data feed, or via an algorithm to generate text from a "raw" data feed consisting only of numbers and coded data fields.

According to yet another embodiment, a pre-recorded audio signal may be utilized. The pre-recorded audio signal might be a special recording that is specific to the event. For instance, the pre-recorded audio signal might represent the sound of a cash register if the event refers to a financial number being announced, and so on.

III. Example

Figure 4:
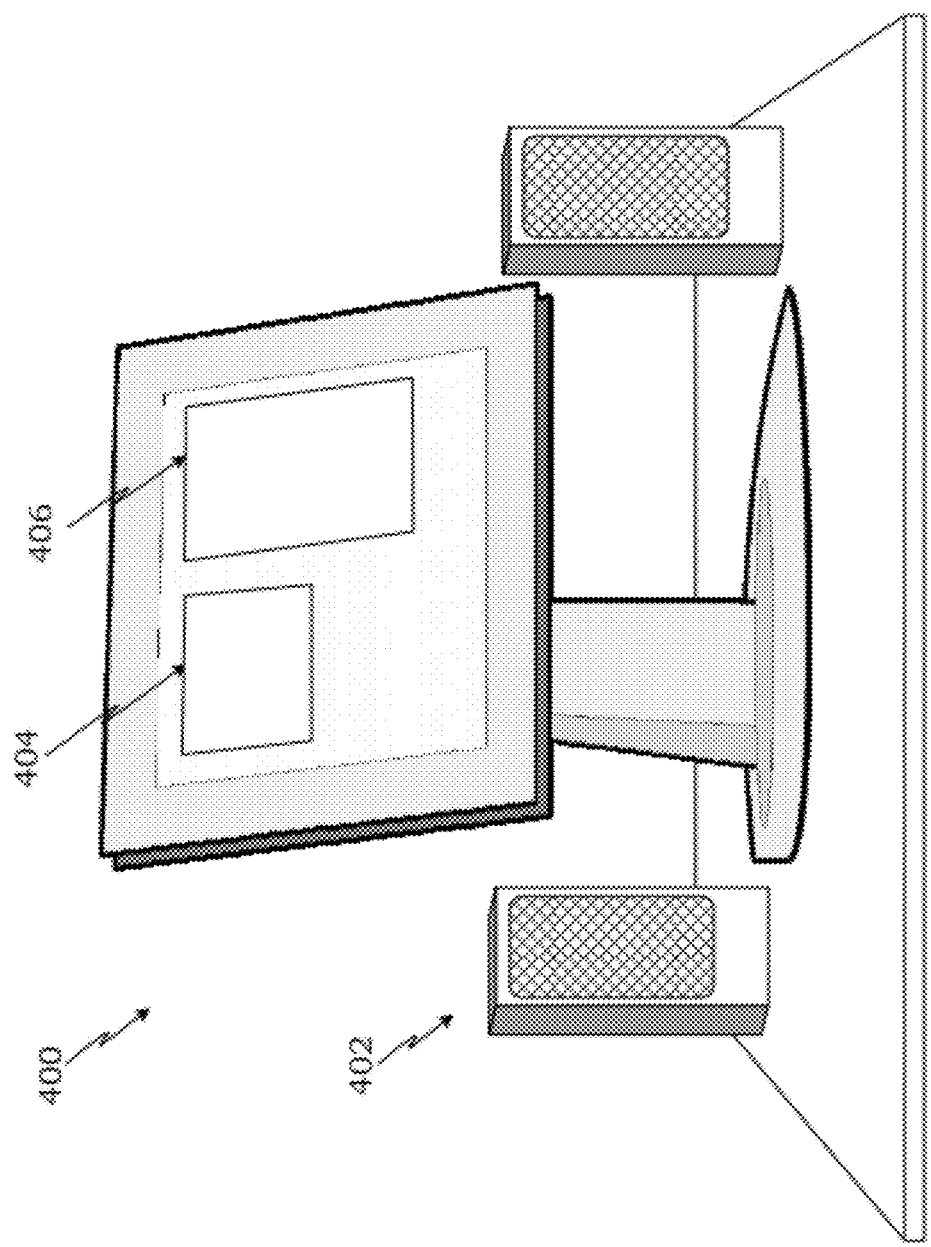
FIGS. 4-5 show example output devices for use in illustrating an example operation of the system and process shown in FIGS. 1 and 2.

FIG. 4 illustrates an example display device 400 that includes a computer screen on which images generated by the computer system 100 may be displayed. Program logic, preferably from another third-party software application, causes the display device 400 to display the images according to an intended manner. In this example, a windowing environment is utilized which presents the user with specially delineated areas of the screen called windows. As known in the art, windowing environments typically allow a window to be resized and moved around the screen. Of course, while a windowing environment is shown, other types of interfaces may instead be used such as a command-line interface.

Window 404 and window 406 are currently being displayed. Each window 404 and 406 may display something of interest to the user. For instance, the window 404 might display a market for one tradable object, whereas the window 406 might display a market for a second tradable object, news, or some other item of interest. The information content being displayed in the windows 404 and 406 is displayed in a particular way according to the software which is programmed to receive the data feed signal. For instance, a trading interface (e.g., such as an interface described in U.S. Pat. Nos. 6,766,304 and 6,772,132) might be used to display the market for a given tradable object.

Assume for this example that the user of the display device 400 input a condition equivalent to the following expression:

If "keyword" is detected in data feed "1," then alert and playback. [1]

In other words, the user programmed the system 100 to alert him when the condition "keyword" occurs in a specific data feed. Also assume for this example that the contents of data feed "1" are currently being displayed in window 404. By setting this alert, the user can now focus more on the contents being displayed in other areas of window 404, on window 406, or on some other item of interest—on or off the screen. It should be understood that the contents of data feed "1" do not need to be displayed for the user to be alerted according to the preferred embodiments, but rather, when the event takes place and the condition is satisfied, the item of interest may simply pop up on the screen. Further, during this time of display, the data feed "1" is preferably being recorded where "n" is set to five seconds, for sake of illustration.

Figure 5:
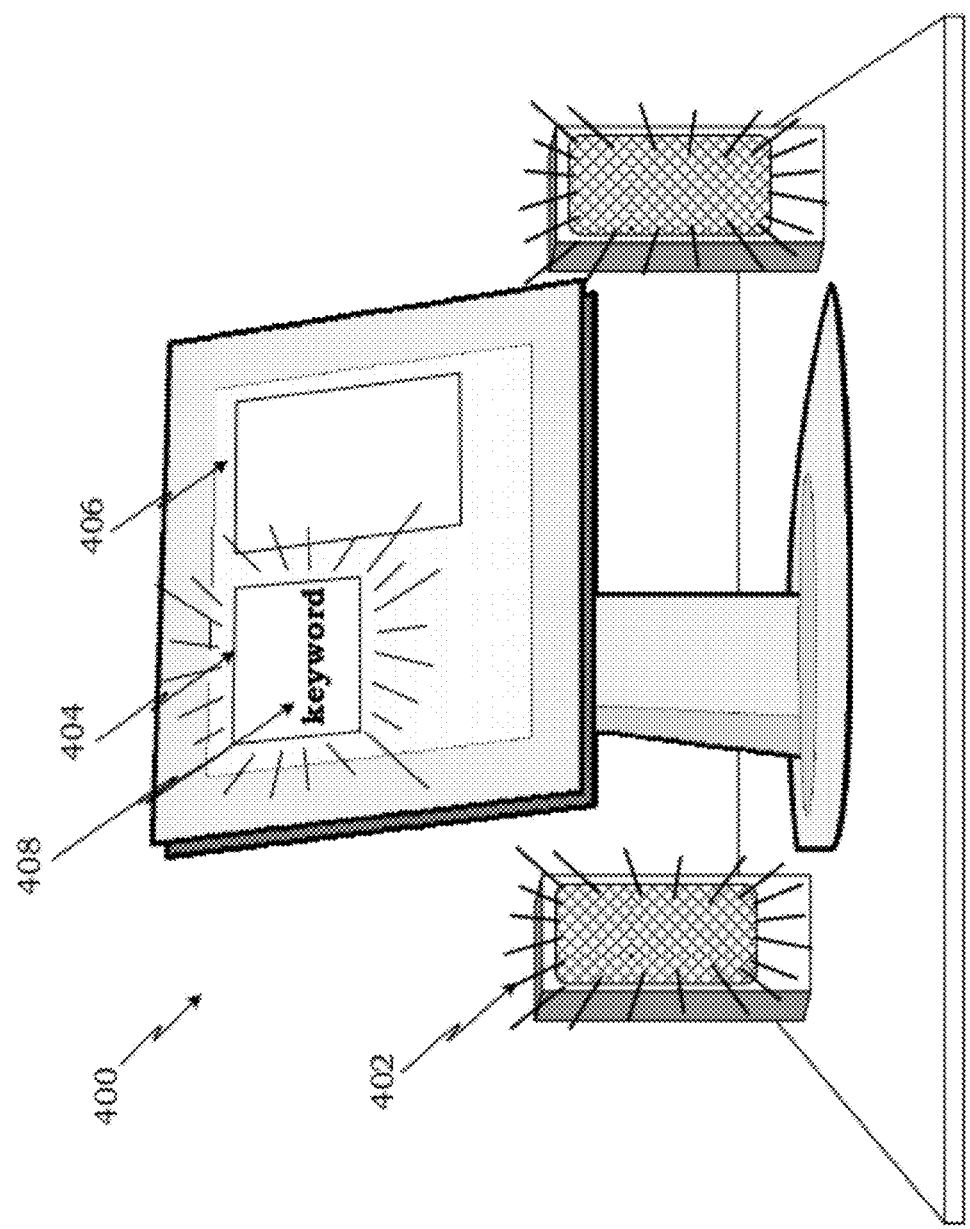

FIG. 5 shows the same example display device 400 as in FIG. 4, except that the event has occurred. When condition [1] is satisfied, the user is preferably alerted along with playback of the five second recording plus any time needed to catch up to the current time. While the example in FIG. 5 shows the window 404 flashing causing the user to direct his attention to the appropriate place, the alerting mechanism preferably operates according to the user's preferences. Additionally, speakers 402 output an audio signal at a preset volume further indicating that the condition has been satisfied. It is also possible that during playback, the area associated with "keyword" is highlighted at 408 thereby making it easier for the user to track the historical path and occurrence of this particular event.

When the condition was satisfied, the example system 100 entered into playback mode causing a recorded portion of window 504 to playback at a preferably faster rate than the original input signal was recorded. During which, the central area of focus was highlighted to the user (e.g., "keyword" at 408). In the preferred embodiment, the playback provides the user with historical context leading up to the current time. The user can then be quickly caught up to the current time concerning that information.

Shortly after the event, the volume of the audio signal output from speakers 502 is gradually turned down and the highlighting of the window 504 is returned to normal operation until another event occurs.

IV. Conclusion

Although the programs, processes, methods and system has been described and illustrated in detail, it is clearly understood that the same is by way of illustration and example only and is not to be taken by way of limitation. Since numerous modifications and changes will readily occur to those skilled in the art, it is not desired to limit the invention to the exact construction and operation shown and described, and accordingly, all suitable modifications and equivalents may be resorted to, falling within the scope of the invention.

According to one embodiment, the example system takes the form of a computer program product that is stored on a computer readable storage medium and is executed by a suitable instruction execution system in the computer-based device. The term computer readable medium, as used herein, refers to any medium that participates in providing instructions to processor for execution. Such a medium may take many forms, including but not limited to, non-volatile media, volatile media, and transmission media. Non-volatile media includes, for example, optical or magnetic disks, such as storage device. Volatile media includes dynamic memory, such as main memory or RAM (random access memory). Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

According to an alternative embodiment, a hardware embodiment might take a variety of different forms. A hardware embodiment may be implemented as an integrated circuit with custom gate arrays or an application specific integrated circuit ("ASIC"). A hardware embodiment may also be implemented with discrete hardware components and circuitry. In particular, it is understood that the logic structures and method steps described in the flow diagrams may be implemented in dedicated hardware such as an ASIC, or as program instructions carried out by a microprocessor or other computing device.

The claims should not be read as limited to the described order of elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

What is claimed is:

1. A method for presenting trading information, the method comprising:
    recording, via a computing device, a predetermined amount of market information received via a data feed for a tradeable object into a memory to store a recorded portion of the market information as the market information is received; and
    replaying, via the computing device, the recorded portion in response to detecting a triggerable event in the data feed, the recorded portion including information for the tradeable object received in the data feed prior to the triggerable event being detected.

2. The method of claim 1 where the recorded portion is replayed at a user-selectable playback rate of a range of playback rates, where the range playback rates includes an upper playback rate limit and a lower playback rate limit.

3. The method of claim 1 further comprising detecting the triggerable event in the market information.

4. The method of claim 1 further comprising replaying the recorded portion according to a user-selectable format.

5. The method of claim 1 where the recorded portion is replayed at least until the replayed recorded portion of the market information coincides with substantially present market information of the data feed.

6. The method of claim 1 where the triggerable event comprises a keyword or keyword phrase.

7. The method of claim 1 where only a part of the recorded portion is replayed in response to the triggerable event being detected.

8. The method of claim 1 where replaying occurs without human intervention after the triggerable event is detected.

9. The method of claim 1 where replaying occurs in response to detecting a user visually focusing on a target area.

10. The method of claim 1 further comprising providing an output for video, audio, or both video and audio components, in response to detecting the triggerable event.

11. The method of claim 10 further comprising ending the output in response to an end of the recorded portion being replayed.

12. A non-transitory computer readable medium having instructions stored thereon for execution by a processor for presenting trading information, the instructions comprising:
    a first software component for recording a predetermined amount of market information received via a data feed for a tradeable object into a memory to store a recorded portion of the market information as the market information is received; and
    a second software component for replaying the recorded portion in response to detecting a triggerable event in the data feed, the recorded portion including information for the tradeable object received in the data feed prior to the triggerable event being detected.

13. The non-transitory computer readable medium of claim 12 where the first and second software components comprise an integrated software application.

14. The non-transitory computer readable medium of claim 12 further comprising an input interface component configured to receive user instructions for the triggerable event.

15. The non-transitory computer readable medium of claim 12 further comprising a data interface component configured to receive the data feed.

16. The non-transitory computer readable medium of claim 12 where the recorded portion is replayed at a user-selectable playback rate of a range of playback rates, where the range playback rates includes an upper playback rate limit and a lower playback rate limit.

17. The non-transitory computer readable medium of claim 12 where the triggerable event is detected in the market information.

18. The non-transitory computer readable medium of claim 12 where the recorded portion is replayed according to a user-selectable format.

19. The non-transitory computer readable medium of claim 12 where the recorded portion is replayed at least until the replayed recorded portion of the market information coincides with substantially present market information of the data feed.

20. The non-transitory computer readable medium of claim 12 where the triggerable event comprises a keyword or keyword phrase.

21. The non-transitory computer readable medium of claim 12 where only a part of the recorded portion is replayed in response to the triggerable event being detected.

22. The non-transitory computer readable medium of claim 12 where replaying occurs without human intervention after the triggerable event is detected.

23. The non-transitory computer readable medium of claim 12 where replaying occurs in response to detecting a user visually focusing on a target area.

24. The non-transitory computer readable medium of claim 12 further comprising an output component for providing video, audio, or both video and audio components, in response to detecting the triggerable event.

* * * * *